United States Patent Office 3,469,406
Patented Sept. 30, 1969

3,469,406
TREATMENT OF CLAY-CONTAINING SOIL
William B. Braden, Jr., and Joseph T. Carlin, Houston, Tex., assignors to Texaco Inc., New York, N.Y., a corporation of Delaware
No Drawing. Filed Dec. 5, 1967, Ser. No. 687,982
Int. Cl. E02d 3/12, 3/14
U.S. Cl. 61—36                                     6 Claims

ABSTRACT OF THE DISCLOSURE

Improved method of treating soil containing a water sensitive clay to stabilize the clay against swelling by mixing the soil with a guanidine salt in a polar oxygenated aliphatic hydrocarbon solvent of a prescribed type and compacting the treated admixture.

---

The present invention is directed to improvements in the method of stabilizing a clay-containing body disclosed and claimed in our copending, commonly assigned patent application Ser. No. 515,707, filed Dec. 22, 1965, now Patent No. 3,360,043, entitled "Method of Treating Clay-Containing Formations With Guanidine Salt Solution." The method of said copending application comprises contacting said clay-containing body with a guanidine salt in a polar oxygenated aliphatic hydrocarbon solvent selected from the group consisting of a lower alkanol, dimethylsulfoxide, an admixture of dioxane and dimethylsulfoxide, and a mixture of said lower alkanols in an amount sufficient to stabilize said clay-containing body. The method of said copending application finds an important application in connection with the recovery of oil from deep underground formations penetrated in modern day drilling operations.

More particularly, the method of the present invention comprises intimately mixing with the soil containing clay or clayey material or a clay or clayey material which is to be applied to the surface of the earth and/or incorporated into soil being used for a road bed or building support, which clay or clayey material is swellable on contact with surface or percolated water, a treating solution of a guanidine salt in a polar oxygenated aliphatic hydrocarbon solvent in an amount effective to prevent and/or decrease water swellability of the clay and then compacting the treated mixture by further treatment to prepare it as a support for erection of load bearing surfaces thereon such as foundation footings or slabs and the like or road beds.

The method of the present invention requires the treating solution to be intimately mixed with the soil or clayey material to permit the treating solution to come in physical contact with the clay portions thereof. In the absence of this intimate physical contacting the treating solution will not reach all of the water sensitive clay components and therefore the beneficial results to be obtained by the method of the present invention will not be completely effective.

Soil at or near the earth's surface containing water sensitive clays generally has relatively deep fissures or cracks therein that are the result of natural or manmade disturbances of the surrounding strata or a combination thereof. This type of surface fault generally is not found in the deep formations associated with producing oil therefrom with which the copending application Ser. No. 515,707 is concerned. Accordingly, the method of the invention disclosed in said copending application does not require the mixing step associated with the method of the present invention.

The soil to be treated can be prepared in a variety of ways. For example, the surface layer thereof and intermediate layers, if necessary, can be removed or pushed aside by mechanical or other means to expose the layer containing the clay formation. If the clay-containing layer is at or near ground level and the fissures thereon are not too deep, it is desirable to apply the treating solution thereto by conventional means, then to scarify or disk up the treated soil to obtain substantially complete mixing of the treating solution with the clay portion of the soil. After the mixing operation and dependent on the end purpose, the disturbed soil can be graded to the desired degree, compacted, if required, further treated to prepare the soil for a foundation or as an earth dam support and the like. A further embodiment contemplates mixing the treating solution with a clay-containing formation at one location and transporting the resulting admixture to another location for incorporation into or as a substitute for poor soil that is sometimes encountered in road building and foundation construction.

The method of the present invention is also applicable to the soil about newly constructed homes, apartment buildings and the like that contains clay which is sensitive to water. In such applications, after the top soil is removed one can mix the treating solution of guanidine salt into the non-clay portion of the soil, then admix the resulting mixture with the clay layer to insure intimate contacting of the treating solution with the clay. Thereafter the soil can be graded as desired and a lawn installed or developed thereon. In this type of application, one cannot bring the treating solution into contact with the clay layer directly such as by spraying thereon because the cracks and fissures in the clay layer and the soil itself might permit too fast a run off of treating solution. This procedure would result in an unbalanced treatment of the clay layer which could result in subsequent damage to the structure erected thereon by the movement and/or swelling of untreated portions of the clay layer when in contact with surface or percolated water.

The guanidine salt used in the present invention is preferably guanidine hydrochloride although other salts such as guanidine hydrobromide, guanidine nitrate, guanidine acetate and mixtures thereof can be used alone or in combination.

The solvent employed in the method of the present invention is a polar oxygenated aliphatic hydrocarbon selected from a lower alkanol, i.e., methanol or ethanol, mixtures thereof, dimethylsulfoxide or a mixture of dimethylsulfoxide and dioxane.

The guanidine salt is used in an amount of from about 0.5 to 65% by weight in the solvent dependent on the salt solubility in the solvent. Most satisfactory results are obtained at concentrations of about 4–16% of guanidine hydrochloride in methanol.

Following is a description by way of example of a method of putting into practice the present invention.

A portion of gumbo soil from a relativtly recently undisturbed area in a suburb of Houston, Tex., was obtained intimately mixed, divided into two parts and placed in individual plastic flower pots.

Approximate analysis of a portion of this soil showed the following mineralogical composition:

| Mineral: | Weight percent |
|---|---|
| Calcite | 52 |
| Quartz | 20 |
| Montmorillonite | 11 |
| Illite | 11 |
| Kaolinite | 5 |
| Feldspar | 1 |

Example I

The soil in one flower pot containing about 450 grams of soil was intimately mixed by hand with 200 ml. of a methanol solution of guanidine hydrochloride (5 grams in 100 ml. of solution). The resulting mixture was hand compacted in the flower pot. The soil in this flower pot was regularly treated over a two month period (five days a week) by applying to the surface thereof approximately 100 ml. portions of distilled water per treatment. At the end of this period and after drying for 14 days at room temperature, the physical appearance of the soil surface was examined. The soil surface was observed to be uniform in appearance and free from fissures.

The plastic container was peeled from the soil without disturbing the contents which were observed to be a uniform bulk of soil. No evidence of sub-surface fissures was noted. The soil on crumbling yielded a pile of uniform granules and powder like a normal soil.

Comparative Example A

The soil in the other flower pot, untreated with guanidine hydrochloride was similarly treated over the same period and at the same frequency with corresponding amounts of distilled water.

At the end of the test period and after drying the surface of this untreated sample was observed to be irregularly cracked and uneven, which is typical of gumbo soil that had been water wet and dried. The unevenness of the surface was attributable to the contraction of the swelled clay on drying. After the plastic container was removed the soil fell apart as chunks. Attempts to crumble these chunks resulted in formation of smaller chunks, i.e., the sample did not crumble as would a normal soil.

The Example I demonstrates the effectiveness of the present invention in the treatment of soils containing a clay that is swellable on contact with water whereby the clay is water desensitized and the soil can be used as a support for load bearing surfaces.

Although emphasis has been placed in this disclosure on the practice of this invention as applied to the construction of concrete slabs such as roads and to the erection of structures and similar supporting foundations in contact with or supported on water sensitive clayey material, the practice of this invention is also applicable to a wide variety of soil stabilizing properties, such as river bank erosion, dam construction, water stabilization of soil and the like for the treatment of a normally water-sensitive clayey material to prevent disintegration and to improve its structural properties, particularly with respect to dimensional stability, cohesiveness and structural strength or load bearing ability.

We claim:

1. Method of treating a water sensitive clay contained in soil located near the earth's surface to prevent clay swelling on contact with water which comprises mechanically mixing with the water sensitive clay a guanidine salt in a polar oxygenated aliphatic hydrocarbon solvent in an amount effective to stabilize said clay against swelling and compacting the resulting treated clay.

2. Method as claimed in claim 1 wherein said guanidine salt is guanidine hydrochloride.

3. Method as claimed in claim 1 wherein said solvent is methanol.

4. Method as claimed in claim 1 wherein said solvent is a mixture of methanol and ethanol.

5. Method as claimed in claim 1 wherein said solvent contains from about 4 to about 16% by weight of guanidine hydrochloride.

6. Method of preparing soil containing a water-sensitive clay for use as a support for a load bearing formation which comprises mixing said clayey soil with guanidine hydrochloride in methanol solution in an amount of 5 to 40% by weight of said solution, based on the weight of the clay, reconstituting the resulting treated clayey soil as a part of the original soil structure, and compacting the resulting reconstituted structure.

References Cited

UNITED STATES PATENTS

| 2,899,329 | 8/1959 | Lyons | 61—36 X |
| 3,360,043 | 12/1967 | Braden et al. | 166—9 |

JACOB SHAPIRO, Primary Examiner

U.S. Cl. X.R.

166—9, 42